3,235,595
Patented Feb. 15, 1966

3,235,595
BIS[o-(2-PROPYNYLOXY)BENZALDEHYDE] AZINE
Chester E. Pawloski, Bay City, Mich., assignor to The Dow Chemical Company, Midland, Mich., a corporation of Michigan
No Drawing. Filed Dec. 26, 1963, Ser. No. 333,640
1 Claim. (Cl. 260—566)

The present invention is directed to a compound corresponding to the formula

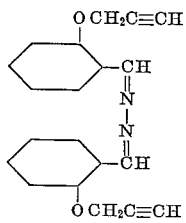

This compound is a solid material which is somewhat soluble in many organic solvents and of low solubility in water. The compound has been found to be useful as a pesticide for the control of various insect, mite, worm, bacterial and fungal organisms such as roundworms, beetles, roaches, mites and bacteria.

The new compound can be prepared by reacting salicylalazine with a propargyl halide such as propargyl bromide or propargyl chloride. The reaction is carried out in the presence of a base such as an alkali metal carbonate and preferably in a liquid reaction medium such as isopropanol, acetone or methyl ethyl ketone. The reaction takes place smoothly at temperatures at which the alkali metal halide of reaction is produced and preferably from about 0 to 100° C. The halide of reaction appears in the reaction mixture as a salt of the metal cation from the employed base. Good results are obtained when one molecular proportion of salicylalazine and greater than one molecular proportion, preferably an excess, of each of the propargyl halide and basic material are employed. Optimum yields are obtained when the reactants are employed at concentrations of two moles each of the propargyl bromide and basic material for every mole of salicylalazine and the use of amounts which represent such proportions is preferred. Upon completion of the reaction, the desired product may be separated and purified by conventional procedures.

In carrying out the reaction, the propargyl halide, the salicylalazine, the basic material and the liquid reaction medium, if employed, are mixed together and maintained at the reaction temperature for a short period to insure completion of the reaction. The reaction mixture can then be filtered to remove the halide of reaction and the filtrate cooled to facilitate the crystallization of the desired product, which may be employed in pesticidal applications. However, in a preferred procedure, the reaction mixture is treated with aqueous alkali metal hydroxide and the mixture heated for a short period of time. The hot reaction mixture is then filtered, diluted with water and the organic layer which separated during the dilution is collected by decantation and heated to remove the low boiling constituents leaving the product as a solid residue. The product can be further purified by such conventional procedures as washing and recrystallazation from a common organic solvent.

In a representative operation, salicylalazine (25 grams), propargyl bromide (30 grams) and potassium carbonate (32 grams) were dispersed in 200 milliliters of acetone and the resulting mixture heated at the boiling temperature and under reflux for 24 hours. At the end of the heating period, 30 milliliters of an aqueous 33 percent sodium hydroxide solution was added and the mixture heated for another two hours. The reaction mixture was then filtered while hot to remove the potassium bromide and the filtrate diluted with water. During the dilution procedure, the reaction mixture divided into an aqueous and an organic layer. The organic layer was separated by decantation and heated to remove the low boiling constituents. As a result of these operations, the bis[o-(2-propynyloxy)benzaldehyde] azine product was obtained as a solid residue melting at 174°–176° C.

The compound of the present invention is useful as a pesticide for the control of many plant and animal pests. For such use, the unmodified compound can be used. Alternatively, the compound can be dispersed on an inert, finely divided solid and the resulting preparation employed as a dust. Also, such preparations can be dispersed in water with or without the aid of a wetting agent and the resulting aqueous dispersions employed as sprays. In other procedures, the compound can be employed in petroleum distillates or other solvents or as a constituent of oil-in-water or water-in-oil emulsions or as aqueous dispersions which can be applied as a spray, drench or wash. In representative operations, finely divided compositions employing bis[o(2-propynyloxy)-benzaldehyde] azine at concentrations of 2 percent by weight gave substantially complete kills of trichstrongylids.

I claim:
Bis[o-(2-propynyloxy)benzaldehyde] azine.

No references cited.

CHARLES B. PARKER, *Primary Examiner.*